(12) United States Patent
Robinson

(10) Patent No.: US 6,618,585 B1
(45) Date of Patent: Sep. 9, 2003

(54) INTERNET-ENABLE BROADCAST RECEIVING APPARATUS

(75) Inventor: Stuart J Robinson, Cardiff (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/461,454

(22) Filed: Dec. 14, 1999

(51) Int. Cl.7 .............................. H04M 3/42; H04H 1/00
(52) U.S. Cl. ....................... 455/414; 455/556; 455/3.02
(58) Field of Search ................................. 709/219, 328, 709/329, 230, 231; 455/414, 3.2, 456, 466, 66, 556, 142, 180.1, 179.1, 3.01, 3.06, 3.02; 379/88.17, 265.09, 900; 708/109; 348/705, 706; 725/62

(56) References Cited

U.S. PATENT DOCUMENTS

| | | | |
|---|---|---|---|
| 4,627,045 A | * 12/1986 | Olson et al. .............. 455/179.1 |
| 5,790,958 A | * 8/1998 | McCoy et al. ............... 455/557 |
| 5,987,029 A | * 11/1999 | Kotani et al. ............... 455/557 |
| 6,091,956 A | * 7/2000 | Hollenberg .................. 455/456 |
| 6,097,383 A | * 8/2000 | Gaughan et al. ............. 455/6.3 |
| 6,108,706 A | * 8/2000 | Birdwell et al. ............ 709/219 |
| 6,134,531 A | * 10/2000 | Trewitt et al. ................. 705/10 |
| 6,148,253 A | * 11/2000 | Taguchi et al. ............. 455/457 |
| 6,298,234 B1 | * 10/2001 | Brunner ...................... 455/432 |
| 6,314,094 B1 | * 11/2001 | Boys .......................... 455/345 |
| 6,442,598 B1 | * 8/2002 | Wright et al. ............... 709/217 |

FOREIGN PATENT DOCUMENTS

EP    0507096 A2 * 10/1992

* cited by examiner

Primary Examiner—Dwayne Bost
Assistant Examiner—Eliseo Ramos-Feliciano
(74) Attorney, Agent, or Firm—Barnes & Thornburg

(57) ABSTRACT

A broadcast receiving apparatus, related apparatus and operation methods, and broadcast and telecommunications signals arranged to support selection and receipt of both radio frequency broadcast and webcast channels in a single device. Handoff between radio frequency broadcast and webcast channels may be automated using information carried in broadcasts and/or telecommunications signals or both.

14 Claims, 3 Drawing Sheets

INTERNET-ENABLE BROADCAST RECEIVING APPARATUS

FIELD OF THE INVENTION

The present invention relates to an apparatus and method for receiving both radio-frequency public broadcast signals and signals transmitted via a telecommunications network, and a system incorporating the same.

BACKGROUND TO THE INVENTION

Public broadcast of for example television and radio signals utilising frequency modulation (FM) and/or amplitude modulation (AM) is well known. Domestic receivers for such signals are also well known and include television sets, video receiver/recorders, and a wide range of radio receivers. Such receivers typically comprise an in-built antenna to receive the signals, but this requires that the set be within range of a broadcast antenna broadcasting on a frequency capable of being received by the set. However broadcast of any given channel is typically geographically constrained limited both by the availability of suitable broadcast antennas, and regulatory approval to broadcast at a given frequency within a given geographic area. Increasing numbers of listeners/viewers take an interest in receiving local broadcast stations whether because of an interest in local issues, or because the local station addresses a particular interest group.

Where listeners/viewers move out of the broadcast area associated with such stations, whether temporarily by, for example, travelling on business or more permanently by, for example, moving home to a new area, then the listeners will no longer be able to receive the broadcasts.

More recently some formerly broadcast-only channels have become available via the Internet. In such an arrangement a personal computer is programmed to receive a digital signal stream via a telephone line to the home/office. The personal computer receives and decodes a signal and plays the received signal via the computer screen and/or loudspeakers. A wide range of formerly broadcast-only channels are available via the Internet in this way, as are an increasing number of "channels" which are available only on the Internet. These latter take advantage of the fact that such distribution via the Internet does not require a regulatory broadcast licence.

However a disadvantage with such an Internet radio arrangement is that it requires a fully functional personal computer typically with large display, keyboard etc. These are typically much more expensive than a conventional broadcast radio receiver to which consumers are accustomed.

OBJECT OF THE INVENTION

The Invention seeks to provide an improved apparatus and method for receipt of public broadcast and Internet broadcast channels and which mitigates the problems associated with the prior art.

SUMMARY OF THE INVENTION

APPARATUS

According to a first aspect of the present invention there is provided a broadcast receiving apparatus comprising: first apparatus arranged so as in a first mode to enable selection and receipt of a radio frequency broadcast channel; second apparatus arranged so as in a second mode to enable selection and receipt of a webcast channel over a telecommunications link.

Advantageously the apparatus can be used whether or not in range of a radio frequency broadcast transmitter, or whether or not a network connection is available.

In one preferred embodiment said telecommunications link is a wireline telecommunications link.

In a further preferred embodiment said wireless telecommunications link is a mobile wireless telecommunications link.

Advantageously, use of a wireless link facilitates mobile use of the receiver apparatus.

Preferably a change of mode is effected responsive to a measure of received radio frequency broadcast channel quality.

Advantageously, switching between modes can take place without user intervention.

In a preferred embodiment, said webcast channel is selected responsive to data received as part of a radio frequency broadcast received.

In a preferred embodiment, said broadcast channel is selected responsive to data received over said telecommunications link.

Advantageously, switching between modes can take place without user intervention.

Preferably said data is provided responsive to a channel selected in said second mode.

Preferably said data is provided responsive to location of said broadcast receiving apparatus.

According to a further aspect of the present invention there is provided a radio-frequency broadcast transmission apparatus comprising: apparatus arranged to modulate data associated with a broadcast channel on said broadcast channel and wherein said radio data comprises identification of a web address associated with said broadcast channel.

Preferably, said indication is indicative of a webcast channel.

The invention also provides for a telecommunications system comprising such broadcast receiving apparatus.

The invention also provides for a radio frequency broadcast system comprising such radio frequency broadcast transmission apparatus.

The invention also provides for a system for the purposes of digital signal processing which comprises one or more instances of apparatus embodying the present invention, together with other additional apparatus.

SIGNAL

According to a further aspect of the present invention there is provided a radio-frequency broadcast signal arranged to carry a broadcast channel and additionally carrying data indicative of an associated web site.

Preferably, said indication is indicative of a webcast channel.

METHOD

According to a further aspect of the present invention there is provided a method of effecting handoff between a radio-frequency broadcast and a telecommunications link comprising the steps of: receiving a broadcast signal from said antenna, said broadcast signal comprising a broadcast channel and associated data indicative of an ass ted webcast channel; establishing a connection over said telecommunication link; requesting a feed of said webcast channel over said telecommunications link.

According to a further aspect of the present invention there is provided a method of effecting handoff between a telecommunications link and a radio-frequency broadcast link comprising the steps of receiving a webcast channel over said telecommunications link, together with associated data indicative of an associated broadcast channel; tuning to said broadcast channel.

According to a further aspect of the present invention there is provided a method of operating a broadcast receiving apparatus comprising first apparatus arranged so as in a first mode to enable selection and receipt of a radio frequency broadcast channel, and second apparatus arranged so as in a second mode to enable selection and receipt of a webcast channel over a telecommunications link, said method comprising the steps of: selecting a first channel in a first of said modes: selecting a second channel in a second of said modes.

The invention is also directed to a method by which the described apparatus operates and including method steps for carrying out every function of the apparatus.

SOFTWARE

The invention is also directed to a program for a computer, comprising components arranged to perform each of the method steps.

GENERAL

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
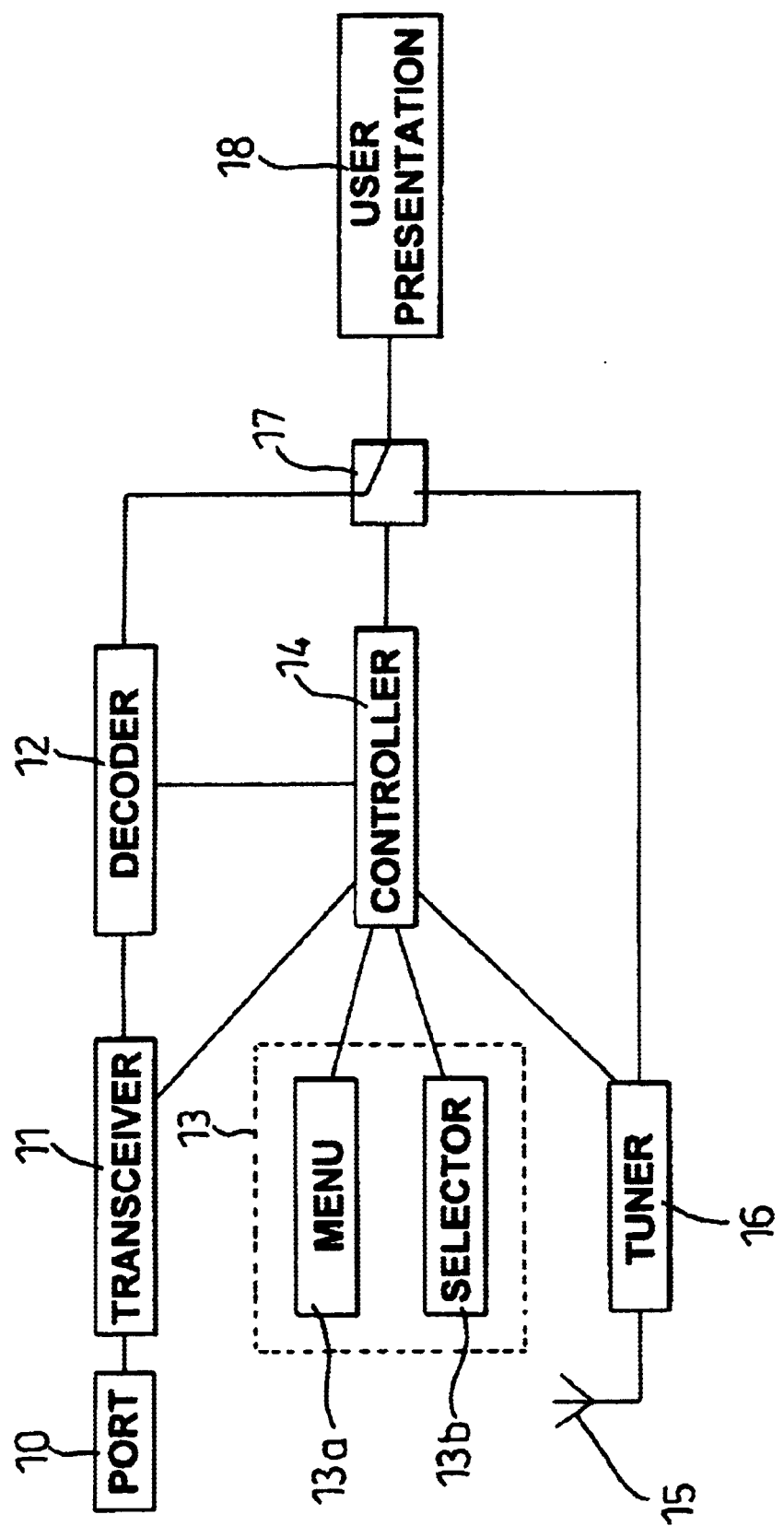
FIG. 1 shows an example of a block circuit diagram of apparatus in accordance with the present invention.

Referring now to FIG. 1, there is shown a block circuit diagram of a Internet enabled broadcast receiving apparatus. The receiving apparatus comprises a network port 10, transceiver 11, decoder 12, channel selection apparatus 13, controller 14, broadcast receiving antenna 15, tuner 16, switch 17, and user presentation device 18.

The user presentation device 18 is switchably connected 17 at any one time either to an output from the tuner 16 or an output from the decoder 12. The IS tuner is connected to and receives broadcast signals via antenna 15. Decoder 12 is connected via the transceiver 11 to the network port 10 via which it receives signals when the port is connected to a suitable network (for example the Internet). The controller 14 is connected to the transceiver 11, decoder 12, switch 17, and tuner 16. The channel selector 13 comprises a menu presentation apparatus 13a (for example a small liquid crystal display) and apparatus 13b for selecting items from a menu (for example user operable buttons to pan up and down through a menu and to confirm selection of a specific displayed item in such a menu). The selector 13b may also include apparatus for selecting whether to receive public broadcast signals or Internet broadcast signals.

The apparatus is arranged to operate in one of two modes: In a first mode as a conventional public broadcast receiver; in a second mode as an Internet broadcast ("Webcast") receiver.

In the first mode the apparatus operates as a conventional public broadcast receiving device. The menu display 13a shows an indication of the channel currently tuned to whilst selector buttons 13b allow the user to scan available frequencies for retuning to another channel. The controller conveys the selection to the tuner and toggles the switch 17 to connect the output from the tuner 16 to the user presentation device.

In a second mode, the menu presentation device 13a presents to a user one or more menus which enable the user by means of the selector device 13b to select an Internet broadcast channel for reception. Once a specific channel has been selected, the controller causes a signal to be send via transceiver 11 and network port 10 to request receipt of the selected channel from the network. The subsequently received signal is received at port 10 and conveyed via transceiver 11 to a decoder 12 (for example in the form of a digital to analogue converter) the output signal of which is fed via switch 17 to the user presentation device 18.

The specific arrangement described assumes that the tuner is arranged to output an analogue signal to the user presentation device. However where for example the tuner is arranged to output digital signals and/or the user presentation device is arranged to receive digital signals, then decoder 12 may be removed or additional digital to analogue and analogue to digital converters inserted in the circuit as would be apparent to one skilled in the art.

The menus presented to the user 13a may either be flat (that is, a single listing of all available channels) or, preferably, structured in hierarchical fashion to simplify navigation. For example a first menu presented to the user may allow selection of a geographical area in the world, selection of which leads to presentation of a second menu listing countries within that geographical area, selection of one of which leads to a third menu which lists individual stations transmitted from the selected country. The present invention is not however restricted to such a structuring and alternative structurings could also be applied, for example according to type of transmission (for example jazz, blues, classical, early music, etc.).

Whether the menus are flat or structured, they may be stored locally within the controller apparatus 14 or downloaded on demand via network port 10. In a preferred embodiment menus may be downloaded from the network but are also cached within the controller apparatus 14. In this way a listener may select a channel details of which are retained in the cache, even though a local network menu server is unavailable, provided the preferred channel itself is nevertheless still available via the network.

In one particular embodiment a history menu of recently selected channels may be stored within the controller 14. This allows a user to reselect a recently selected channel directly from the history menu, without having to renavigate the main menus.

Storage means within the controller apparatus 14 may also be used in conjunction with the display apparatus 13a and selector apparatus 13b to allow the user to "bookmark" selected channels whereby to create a personal, customized menu for future use.

The user interface 13 may also comprise programmable preset buttons which user may program automatically to select radio frequency broadcast channels, or internet broadcast channels.

Figure 2:
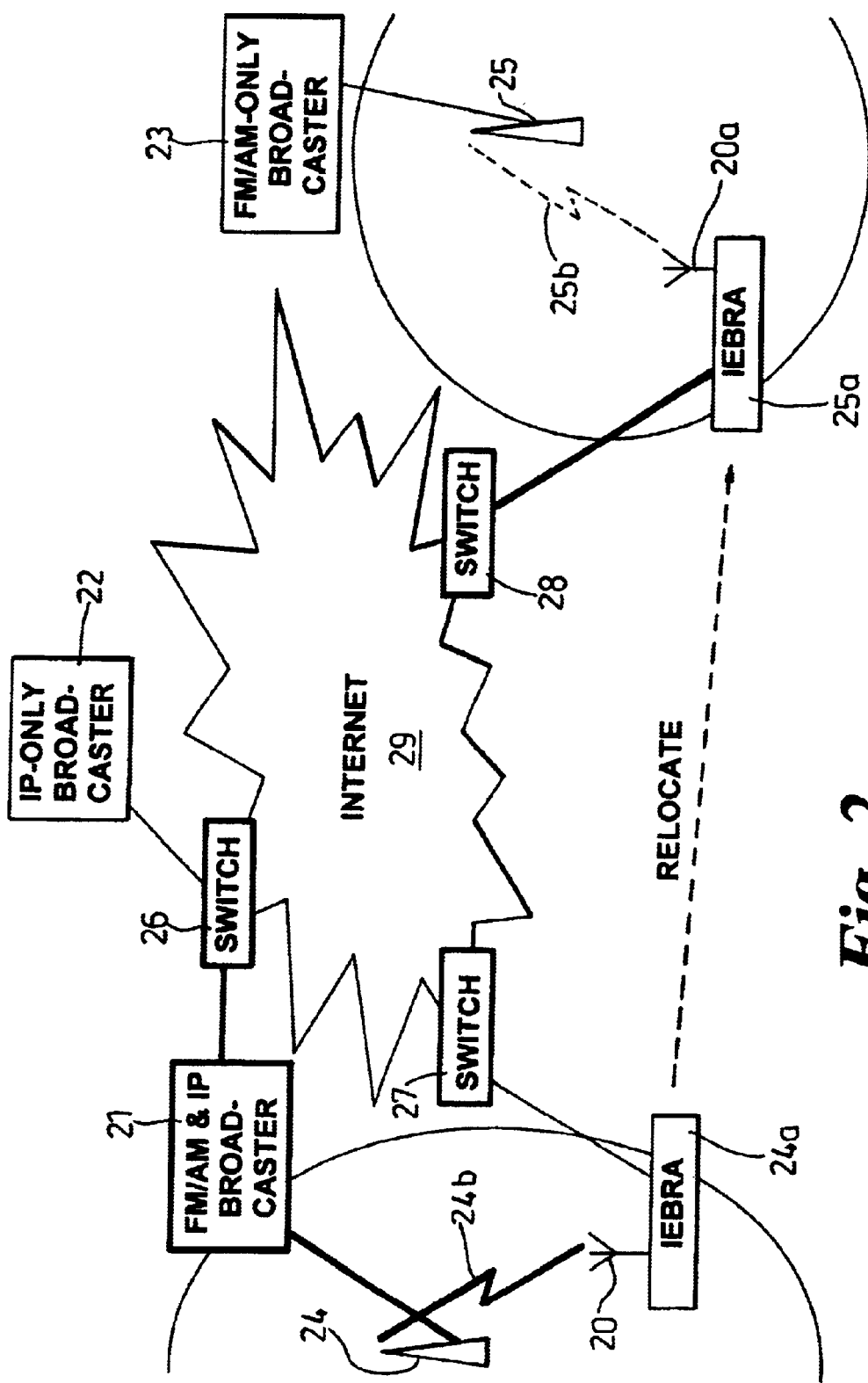
FIG. 2 shows a first example of how apparatus in accordance with the present invention would receive Internet and/or public broadcast channels.

Referring now to FIG. 2, there is shown an example of how such an Internet enabled broadcast receiving apparatus would be used in practice.

The arrangement shows an internet distribution network 29 having a number of access switches 26, 27, 28 to which both internet broadcasters 21, 22 and receivers 20, 20a are connected. The arrangement also comprises public broadcasters 21, 23 connected via broadcast antenna 24, 25, to receivers 20 20a. The arrangement shows an IP only broadcaster 22, a public broadcast only broadcaster 23, and a broadcaster 21 providing both public broadcast and IP broadcast.

The Internet Enabled Broadcast Receiving Apparatus (IEBRA) 20 is shown connected to access switch 27 and by means of a broadcast link 24b from broadcast antenna 24, the IEBRA 20 lying within the broadcast range 24a of antenna 24. The IEBRA 20 is therefore able to receive broadcasts from broadcaster 21 either via a conventional public broadcast link 24b or as an internet broadcast transmitted over the internet 29. The receiving apparatus can also, in this arrangement, receive internet-only broadcasts over the Internet from internet only broadcaster 22. The receiver cannot receive broadcasts from the public broadcast only broadcaster 23 since the receiving apparatus falls outside the maximum range 25a of that broadcaster's transmitting antenna 25.

If the user of the IEBRA 20 were to relocate to the position of IEBRA 20a, then he would be in a position to receive broadcasts from broadcaster 23 via antenna 25. However by virtue of the internet enabling aspect of the apparatus, the IEBRA 20a may also be directly connected via an access network to an access switch 28 on the internet 29. Despite having moved out of the public broadcast range of broadcaster 21, the receiving apparatus 20a may still be used to receive transmissions from broadcaster 21 via the internet 29 so that the user can still listen to a favorite channel using the same receiving apparatus.

If the IEBRA 20 is relocated to a location where it is not possible to connect to the internet, then the apparatus continues to function as a public broadcast receiving apparatus. Conversely In areas of poor FM/AM broadcast reception, the apparatus can be used primarily for Internet broadcast reception.

Figure 3:
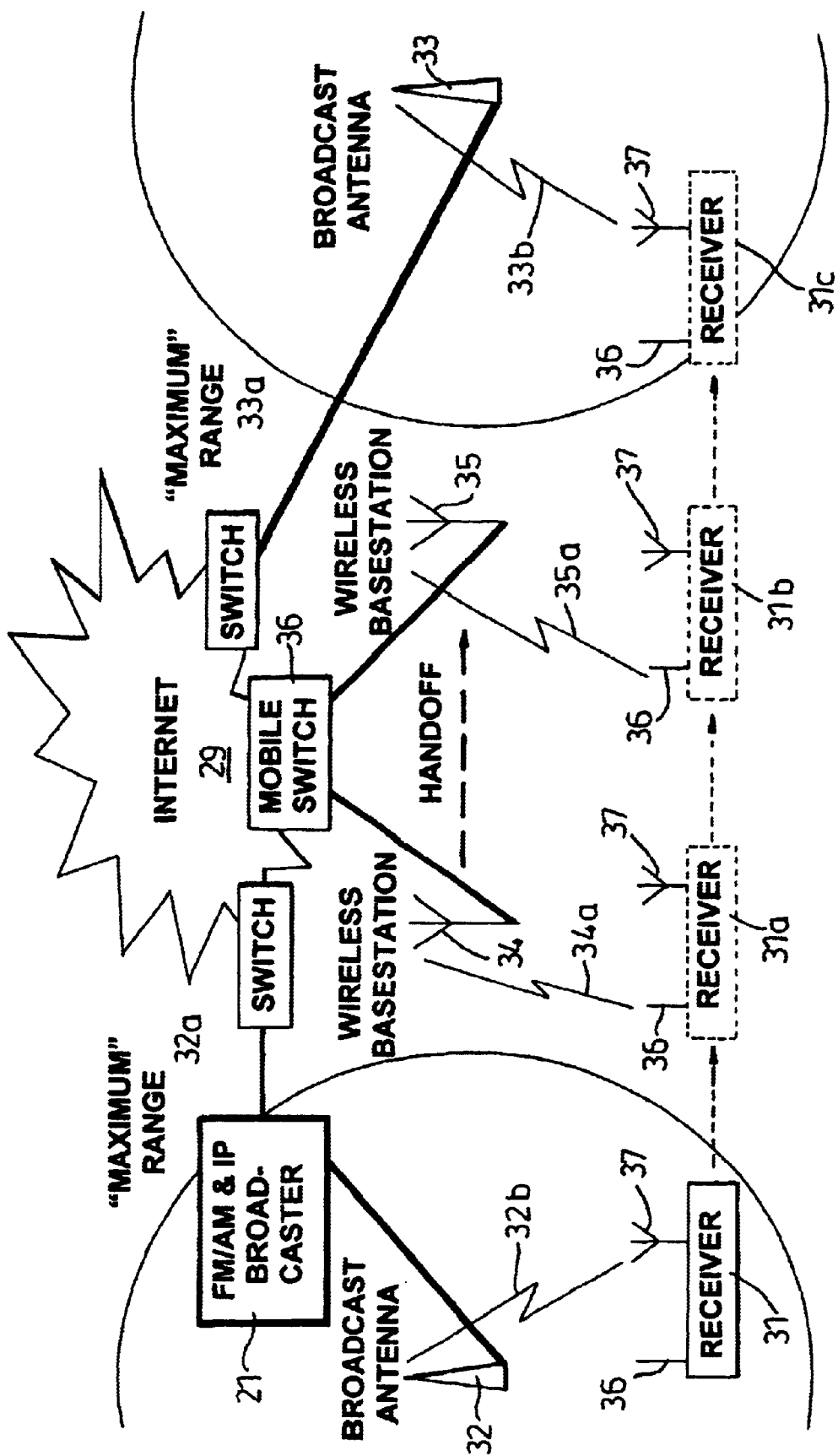
FIG. 3 shows a second example of how a receiver in accordance with the present invention would receive Internet and/or public broadcast channels.

Referring now to FIG. 3 there is shown a further scenario in which an IEBRA may be used to advantage. In this arrangement the IEBRA 31 comprises a broadcast receiving antenna 37 and a wireless communications antenna 36. In this arrangement transceiver 11 is arranged to support wireless telephony transmissions (for example GSM).

In a first location 31, the receiver is within the maximum range 32a of broadcast antenna 32 and receives public broadcast signals 32b via an FM/AM antenna 37. The IEBRA 31 in this scenario is however portable or located, for example, in a motor vehicle and while in operation moves through a series of locations 31, 31a, 31b, 31c. In location 31c the IEBRA is located within the maximum range 33a of a second broadcast antenna 33 and can receive broadcast signals 33b on its public broadcast receiving antenna 37.

However while in transit 31a, 31b the receiver lies outside the maximum ranges of either of these broadcast antennas. In a conventional public broadcast receiving apparatus, the receiver would be unable to receive signals from either broadcast antenna 32, 33 or receive at best a seriously degraded signal. In the present arrangement the IEBRA monitors the quality of the signal received from the broadcast antenna 32. In a conventional car radio arrangement the receiver would make use of the Radio Data System (RDS) data to seek an alternative broadcast antenna 33 from which to receive signals, and effect handover. In some cases however, as in the situation illustrated, the receiver 31a, 31b may find itself in an area not served by a broadcast antenna from which to receive a continued broadcast of the same channel. Where this Is the case the IEBRA, rather than tune to an arbitrary public broadcast station, switches to an internet broadcast mode and makes a connection 34a with a mobile telephony basestation 34 whereby to continue to receive the same broadcast channel, but by means of the internet 29 accessed via a radio link 34a. Information identifying an internet channel associated with a given radio frequency broadcast channel may be communicated to the receiving apparatus by means of the RDS. In addition to providing the receiving apparatus with details of the received broadcast channel's name, and alternative frequencies on which the same broadcast channel can be received from nearby broadcast transmitters, an associated web address may be downloaded over the broadcast channel to the receiver.

As the receiver continues to move from location 31a to 31b, conventional handoff is effected between telephony basestations 34, 35 so as to allow the user to continue to receive the channel of choice.

By continuing to monitor the strength of public broadcast signals on appropriate frequencies, the receiver 31c may revert to receive public broadcast signals from the broadcast antenna 33 when it moves back within the maximum range 33a of such an antenna. In a preferred arrangement, the receiver scans most recently received RDS information relating to transmission frequencies of the broadcast channel of interest. Regardless of which direction the user is moving away from the previous broadcast antenna 32, he is most likely to move next within range of another broadcast antenna 33 identified in the RDS broadcasts of broadcast antenna 32.

In an alternative embodiment, the network identifies the approximate location of the receiver by identifying the wireless basestation 34, 35 to which it is currently communicating. This location information is compared with public broadcast antenna location information and an indication of the frequencies on which a selected internet channel is available by broadcast locally, is transmitted via the wireless basestation to the receiver. The receiver uses this information to scan for an acceptable quality broadcast signal, switching to receive the broadcast signal when suitable broadcast channel is found.

Since the cost of establishing and maintaining a mobile telephony link 34a, 35a is typically greater than that of receiving public broadcast signals 32b, 33b, the IEBRA preferably comprises some means to indicate to the user whether the receiver is operating in public broadcast receipt mode or mobile telephony signal receipt mode. This may take the form of a visual indication (for example an LED illuminated while in mobile telephony mode) or an audio indication (for example an "bleep" on change of mode, and/or a periodic "bleep" while in mobile telephony operation, though the latter may be less desirable to the user—in a preferred embodiment, the user may switch off the audio indication). Where the receiver is arranged to receive video signals, the indication may form part of the image displayed to the user.

Clearly a single IEBRA may comprise both a wireless internet transceiver arrangement and a fixed access internet radio transceiver arrangement for greatest flexibility.

In summary, there is provided a broadcast receiving apparatus, related apparatus and operation methods, and broadcast and telecommunications signals arranged to support selection and receipt of both radio frequency broadcast and webcast channels in a single device. Handoff between radio frequency broadcast and webcast channels may be automated using information carried in broadcasts and/or telecommunications signals or both.

Any range or device value given herein may be extended or altered without losing the effect sought, as will be apparent to the skilled person for an understanding of the teachings herein.

What is claimed is:

1. A broadcast receiving apparatus comprising:
   first device arranged to select and receive at least one radio frequency broadcast channel;
   second device arranged to select and receive at least one webcast channel over a telecommunications link;
   third device arranged to switch automatically from receipt of a webcast channel to receipt of a radio frequency broadcast channel responsive to a measure of the quality of the radio frequency broadcast channel.

2. A method of operating a broadcast receiving apparatus comprising first device arranged so as in a first mode to enable selection and receipt of a radio frequency broadcast channel, and second device arranged so as in a second mode to enable selection and receipt of a webcast channel over a telecommunications link, said method comprising the steps of:
   selecting a webcast channel in said second mode;
   selecting a radio frequency broadcast channel in said first mode whereby to effect a change of mode;
   wherein the change of mode is effected automatically responsive to a measure of quality of the radio frequency broadcast channel.

3. A broadcast receiving device comprising:
   first device arranged so as in a first mode to enable selection and receipt of a radio frequency broadcast channel;
   second device arranged so as in a second mode to enable selection and receipt of a webcast channel over a telecommunications link;
   third device arranged to effect a change of mode from said second mode to said first mode automatically responsive to a measure of the quality of the radio frequency broadcast channel.

4. A broadcast receiving apparatus according to claim 1 wherein said telecommunications link is a wireline telecommunications link.

5. A broadcast receiving apparatus according to claim 1 wherein said telecommunications link is a mobile wireless telecommunications link.

6. A broadcast receiving apparatus according to claim 1 wherein said webcast channel is selected responsive to data received as part of a radio frequency broadcast channel.

7. A receiver according to claim 6, in which the data is Radio Data Service data.

8. A receiver according to claim 6 in which the data comprises a web address.

9. A broadcast receiving apparatus according to claim 1 wherein said broadcast channel is selected responsive to data received over said telecommunications link.

10. A broadcast receiving apparatus according to claim 9 wherein said data is provided responsive to a channel selected in said second mode.

11. A broadcast receiving apparatus according to claim 9 wherein said data is provided responsive to location of said broadcast receiving apparatus.

12. A telecommunications system comprising broadcast receiving apparatus according to claim 1.

13. A receiver according to claim 1 further comprising:
   an indicator arranged to provide to a user of the broadcast receiving apparatus an indication of a current mode of reception.

14. A receiver according to claim 13 in which the indication is one of an audio indication, and a visual indication.

* * * * *